United States Patent Office 3,493,375
Patented Feb. 3, 1970

3,493,375
METHINE DYES AND THEIR USE IN
PHOTOGRAPHY
Aloys Laurent Van der Auwera, Lindenlei 56,
Mortsel-Antwerp, Belgium
No Drawing. Filed Apr. 20, 1966, Ser. No. 543,795
Claims priority, application Great Britain, Apr. 20, 1965,
16,516/65, 16,517/65
Int. Cl. G03c 1/84, 1/12
U.S. Cl. 96—84   6 Claims

ABSTRACT OF THE DISCLOSURE

Photographic materials are described comprising a colloidal layer containing filter and/or anti-halation methine dyes of the formula

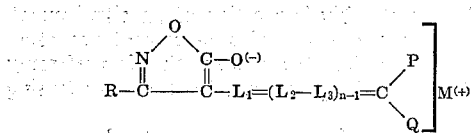

wherein
R represents a lower alkyl radical,
$L_1$ represents

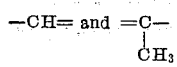

$L_2$ represents =CH—,
$L_3$ represents

where $R_3$ is hydrogen and lower alkyl,
$n$ represents 1 or 2,
$M^{(+)}$ represents a hydrogen, metal, or onium cation,
and each of P and Q represents an electronegative group, or $$\begin{matrix} P \\ \diagdown \\ \phantom{P}C= \\ \diagup \\ Q \end{matrix}$$

represents the atoms necessary to close a heterocyclic nucleus with electronegative character.

This invention relates to the preparation of methine dyes of the oxonol type for use in photographic materials, to materials containing said dyes and to new trimethine oxonol dyes. The present invention more particularly relates to photographic silver halide materials, wherein filter and/or antihalation dyes are used, which are easily discharged in at least one of the photographic processing liquids.

The dyes used according to the present invention meet the severe demands, which are made on antihalation or filter dyes for photographic materials on the base of light-sensitive silver halide, in other words they do not desensitize or fog a light-sensitive silver halide emulsion, are well miscible with a photographic colloid e.g. gelatin, can easily and in situ be incorporated into the photographic material in a non-diffusible form, possess an intensive tinctorial power and are discharged quickly, completely and irreversibly without formation of coloured degradation products in an alkaline or acid reducing medium, such as an alkaline photographic developing bath or an acid fixing bath containing sodium hydrogen sulphite.

The methine dyes according to the present invention can be characterized by the following general formula:
(I)

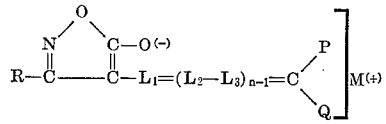

wherein:
R represents an alkyl or aralkyl radical, e.g. methyl or benzyl.
Each of $L_1$, $L_2$ and $L_3$ (same or different) represents a methine radical or substituted methine radical, e.g. an alkyl- or aralkyl-substituted methine radical.
P and Q each represents an electronegative group e.g. a —CN, —COOR$_7$ group, wherein R$_7$ represents a hydrogen atom or an alkyl radical, e.g. an alkyl radical of the formula $C_wH_{2w+1}$ wherein $w$ represents an integer from 1 to 4, or a —CO—R$_8$ radical, wherein R$_8$ represents an alkyl radical such as methyl or ethyl or an aryl radical such as phenyl, or P and Q represent in the radical

the necessary atoms to close a heterocyclic nucleus with electronegative character, e.g. a cyclic ketomethylene nucleus such as those of the pyrazolone series (e.g. 3-methyl-1-phenyl-5-pyrazolone, 1-phenyl-5-pyrazolone, 1-(2-benzothiazolyl)-3-methyl-5-pyrazolone), those of the isoxazolone series (e.g. 3-phenyl-5-isoxazolone, or 3-methyl-5-isoxazolone), those of the oxindole series (e.g. 1-alkyl-2,3-dihydro-2-oxindoles), those of the 2,4,6-triketohexahydropyrimidine series (e.g. barbituric acid or 2-thiobarbituric acid as well as their derivatives such as those substituted in the 1-position by an alkyl group, such as a methyl group, an ethyl group, a 1-n-propyl group and 1-n-heptyl group, or those substituted in the 1- and 3-position by an alkyl group, or those substituted in the 1- or 3-position by a β-methoxy ethyl radical, or those substituted in the 1- and 3-position by an aryl radical such as a phenyl radical, or those substituted in the 1- and 3-position by a substituted phenyl radical such as a p-chlorophenyl radical, or a p-ethoxy-carbonyl phenyl radical, or those substituted only in the 1-position by a phenyl-, a p-chlorophenyl- or p-ethoxy carbonylphenyl radical, further the alkyl and aryl substituted derivatives such as 1-ethyl-3-phenyl or 1-n-heptyl-3-phenyl derivatives), those of the rhodanine series (i.e. 2-thio-2,4-thiazolidinedione series), such as rhodanine, and aliphatic substituted rhodanines (e.g. 3-ethyl-rhodanine, or 3-allyl-rhodanine), those of the 2-imidazo[1,2-a]pyridone series, those of the 5,7-dioxo-6,7-dihydro-5H-thiazolo[3,2-a]pyrimidine series (e.g. 5,7-dioxo-3-phenyl-6,7-dihydro-5H-thiazolo[3,2-a]pyrimidine), those of the 2-thio-2,4-oxazolidinedione series (i.e. those of the 2-thio-2,4-oxazoledione series) (e.g. 3-ethyl-2-thio-2,4-oxazolidinedione), those of the thianaphthenone series (e.g. 3-thianaphthenone), those of the 2-thio-2,5-thiazolidinedione series (i.e. the 2-thio-2,5-thiazoledione series) (e.g. 3-ethyl-2-thio-2,5-thiazolidinedione), those of the 2,4-thiazolidinedione series (e.g. 2,4-thiazolidinedione, 3-alphanaphthyl-2,4-thiazolidinedione), those of the 2-imino-4-thiazolidone series (i.e. pseudo thiohydantoin) (e.g. 2-imino-4-thiazolidone, 3-ethyl-2-imino-4-thiazolidone, 3-phenyl-2-imino-4-thiazolidone, 3-alpha-naphthyl-2-imino-4-thiazolidone), those of the 4-thiazolone series (e.g. 2-ethyl-mercpato-4-thiazolone, 2-alkylphenylamino-4-thiazolones, 2-diphenylamino-4-thiazolone), those of the 2-imino-4-oxazolidone (i.e. pseudohydantoin) series, those of the 2,4-imidazolidinedione (hydantoin) series (e.g. 2,4-imidazolinedione, 3-ethyl-2,4-imidazolinedione, 3-phenyl-2,4-imidazolidinedione, 3-alphanaphthyl-2,4-imidazolidinedione, 1,3 - diethyl - 2,4-imidazolidinedione, 1-ethyl - 3 - phenyl-2,4-imidazolidinedione, 1-ethyl-3-alpha-naphthyl-2,4-imidazolidinedione, 1,3-diphenyl-2,4-imidazolidinedione), those of the 2-thio-2,4-imidazolidinedione (i.e. 2-thiohydantoin) series (e.g. 2-thio-2,4-imidazolidinedione, 3-ethyl-2-thio-2,4-imidazolidinedione, 3-phenyl-2-thio - 2,4-imidazolidinedione, 3-alpha-naphthyl-2-thio-2,4-imidazolidinedione, 1,3-diethyl-2-thio-2,4-imidazolidinedione, 1-ethyl-3-phenyl-2-thio-2,4-imidazolidinedione, 1-ethyl-3-alpha-naphthyl-2-thio-2,4-imidazolidinedione, 1,3-diphenyl-2-thio-2,4-imidazolidinedione), those of the 5-imidazolone series (e.g. 2-n-propylmercapto-5-imidazolone).

$n$ represents 1 or 2.

$M^{(+)}$ represents a cation, e.g. a hydrogen cation, a metal cation or an onium cation of inorganic as well as of organic type, e.g. ammonium or pyridinium.

According to a first method symmetrical and asymmetrical trimethine dyes of the present invention can be prepared by condensing an isoxazolone compound having the following structural Formula II:

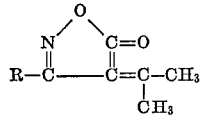

wherein R has the same significance as described above, with a compound having the following structural Formula III.

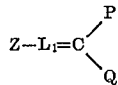

wherein:

$L_1$, P and Q have the same meaning as described above.

Z represents an amino- or substituted amino radical, e.g. an anilino radical, an acetanilido radical, a hydroxy radical, a $R_1O$-radical or a $R_1S$-radical, wherein $R_1$ represents an alkyl radical, e.g. methyl or an aralkyl radical, e.g. benzyl.

The condensation is preferably carried out with heating in the presence of a basic condensing agent, e.g. pyridine or triethylamine, and in the case Z is an amino- or substituted amino radical in the presence of an acid anhydride, e.g. acetic anhydride.

The compound having the general Formula II can be prepared, according to B. Schiff, Ber. 30 (1897) 1340, by condensing acetone with the oxime of a β-ketoacid ester according to the following general Formula IV:

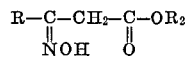

wherein:

R has the same significance as described above.

$R_2$ represents an alkyl radical, e.g. methyl, an aralkyl radical, e.g. benzyl, an aryl radical, e.g. phenyl, or a furyl radical.

Surprisingly according to a second method trimethine dyes of the present invention could also be prepared as illustrated by the following reaction scheme:

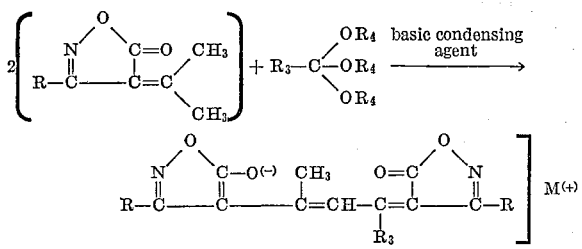

wherein:

R and $M^{(+)}$ have the same significance as described above.

$R_3$ represents a hydrogen atom, an alkyl radical, e.g. methyl or ethyl or an aralkyl radical, e.g. benzyl.

$R_4$ represents an alkyl radical, preferably methyl or ethyl, or an aralkyl radical, e.g. benzyl.

In the above reaction scheme the isopropylidene-substituted isoxazolone compound can be replaced by:

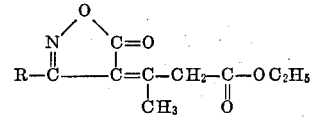

which compound can be prepared according to B. Schiff, Ber. 30 (1897) 1343.

According to a third method trimethine dyes of the present invention can be prepared by condensing a compound having the following structural formula:

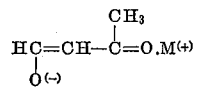

wherein $M^{(+)}$ preferably is a cation of an alkali metal, e.g. sodium, with the oxime of a β-ketoacid according to general Formula IV. This condensation is preferably also carried out in the presence of a basic condensing agent, e.g. pyridine.

Monomethine dyes for use according to the present invention can be prepared by condensing a compound corresponding to general Formula III with the oxime of a β-ketoacid ester or amide which can be represented by the following general Formula V:

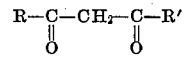

wherein:

R has the same meaning as described above.

R' represents an alkoxy radical, e.g. a methoxy radical, an aralkoxy radical e.g. a benzyloxy radical, an aryloxy radical, e.g. a phenyloxy radical, a furyloxy radical, an amino radical, or a substituted amino radical, e.g. an aromatically substituted amino radical, e.g. an anilino radical, preferably a methoxy radical, or an ethoxy radical.

In the reaction of this type condensation of the oxime proceeds simultaneously with the isoxazolone ring closure, so that starting from the oxime the dyestuff is formed in one step.

The oxime can be prepared by allowing to react the β-ketoesters or β-ketoacid amides according to the general Formula V with a hydroxylamine salt, e.g. the hydrochloride, in the presence of a base, e.g. pyridine, piperidine, triethylamine or ammonia, and preferably also in the presence of a diluent, e.g. water, methanol, ethanol, diethyl ether, methylene chloride, chloroform, carbon tetrachloride or dioxan.

Symmetrical methine dyes according to the present invention which have proved to be very useful can be represented by the following general formula:

(VI) 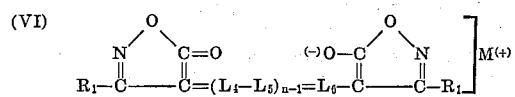

wherein:

$R_1$ represents an alkyl or aralkyl radical, e.g. methyl or benzyl.

Each of $L_4$, $L_5$ and $L_6$ represents a methine radical, $n$ represents 1 or 2.

$M^{(+)}$ represents a cation, e.g. a hydrogen cation, a metal cation or an onium cation of inorganic as well as of organic type, e.g. ammonium or pyridinium.

The method of preparation of the symmetrical methine dyes according to the present invention is characterized in that the oxime of a β-ketoacid ester or β-ketoacid amide is made to react with a compound known to those skilled in the art as a compound suitable to introduce a methine group or a polymethine chain in methine dyes.

As an illustration for such compounds the following general Formulae VII, VIII and IX are given:

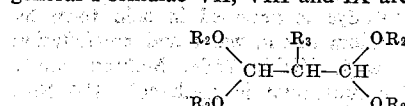

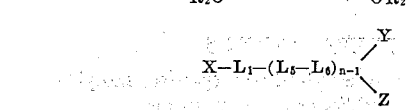

or

wherein:
R₂ represents an alkyl radical.
R₃ represents hydrogen or an alkyl radical.
Each of X, Y and Z represents a halogen atom, a

radical wherein Z' represents the atoms for completing a heterocyclic nucleus, hydroxy radical, a R₂O— radical, a R₂COO— radical, a R₂S— radical, or a R₂Se— radical, wherein R₂ has the same meaning as described above, or a

radical wherein R₄ and R₅, the same or different, represent a hydrogen atom, an alkyl radical, an aryl radical or an acyl radical,
A represents oxygen, sulphur, selenium, a R₄—N= radical wherein R₄ has the same meaning as described above, a

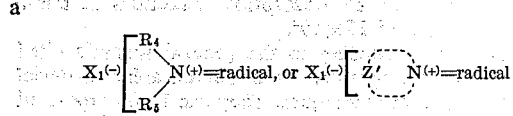

wherein R₄, R₅ and Z' have the same meaning as described above and X₁⁽⁻⁾ represents an anion.
Each of L₄, L₅ and L₆ has the same meaning as described above, and n is 1 or 2.

More particularly for the introduction of a monomethine group an ortho-ester, e.g. methyl orthoformate or ethyl orthoformate, an orthothioester, an amide, a thioamide, an amide acetal, an acyloxyacetal, an amide dichloride, an amidine, an iminoether or iminothioether, and for the introduction of a trimethine chain an alkoxyacroleine acetal, anilinoacroleine anil or malonaldehyde diacetal can be used.

In the reaction of this type, the condensation of the oxime with the methine group— or methine chain-introducing compound proceeds simultaneously with the isoxazoline ring closure, so that starting from the oxime the dyestuff is formed in one step.

Preferably the condensation reaction is started with the oxime of a compound of the following general formula:

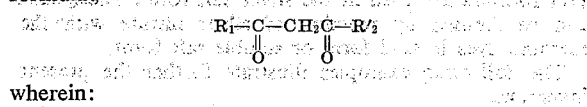

wherein:
R₁ has the same significance as described above.
R′₂ represents an alkoxy radical, an aralkoxy radical, an aryloxy radical, a furyloxy radical, an amino radical, or a substituted amino radical, e.g. an aromatically substituted amino radical e.g. an anilino radical, preferably a methoxy or ethoxy radical, which oxime is prepared by making to react said compound with an hydroxylamine salt, e.g. the hydrochloride, in the presence of a base, e.g. pyridine, piperidine, triethylamine or ammonia, and preferably also in the presence of a diluent, e.g. water, methanol, ethanol, diethyl ether, methylene chloride, chloroform, carbon tetrachloride or dioxan.

The monomethine dye 3-methyl-4-[(3-methyl - 5 - hydroxy-4-isoxazolyl) - methylene]-5-isoxazolone, although preferably prepared according to the method of the present invention, can also be prepared according to Papini, Gazz. Chim. Ital. 81 (1951) 230–235.

The following illustrates the preparation of methine dyes suited for use according to the present invention.

PREPARATION 1

3-methyl-4-{1-methyl-3[3-methyl - 5 - hydroxy-4-isoxazolyl]-2-propenylidene}-5-isoxazolone

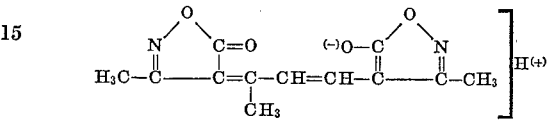

*Method 1(a).*—To a solution of 2.8 g. (0.015 mol) 3-methyl-4-anilino-methylene-5-isoxazolone in a mixture of 15 ccs. of pyridine, and 2.1 ccs. (0.015 mol) of triethylamine are added 2.1 g. (0.05 mol) of 3-methyl-4-isopropylidene-5-isoxazolone prepared according to B. Schiff (Ber. 30, 1340) and 1.5 ccs. of acetic anhydride. The reaction mixture is heated for half an hour on a water bath. After cooling, the solution is acidified with 2 N hydrochloric acid. The oxonol dye, precipitated in its acid form, is sucked off and washed with water, isopropanol and ether. After being recrystallized from a mixture of dimethylformamide and water, the dye melts with decomposition at 250° C. Yield: 30%. Absorption maximum in methanol: 515 Nm.

*Method 1(b).*—A solution of 8.9 g. (0.064 mol) of 3-methyl-4-isopropylidene - 5 - isoxazolone in 8 ccs. of pyridine and 6.4 ccs. (0.042 mol) of ethylorthoformate are heated for three hours on a water bath. Whilst cooling in ice 8 ccs. of ether are added to the reaction mixture and the dye is allowed to crystallize. The yield as pyridinium salt amounts to 0.7 g. (yield: 7%). The melting point is 228° C. (decomposition) after recrystallization from a mixture of pyridine and ether. Absorption maximum in methanol: 515 Nm.

*Method 1(c).*—To a solution of 8.4 g. (0.1 mol) of sodium hydrogen carbonate in 50 ccs. of water first are added 13.5 ccs. (0.1 mol) of ethyl acetoacetate and thereafter portionwise whilst stirring 7 g. (0.1 mol) of hydroxylamine hydrochloride. The reaction mixture is left half an hour and the oxime formed extracted three times with ether. After drying the ether extracts on anhydrous calcium chloride 5.4 g. (0.05 mol) of formylacetone sodium salt and 60 ccs. of pyridine are added and the mixture is heated for 2 hrs. on a water bath, in order to slowly evaporate the ether. The dye is separated and purified as described in method 1(a). Melting point with decomposition: 250° C.–260° C. Yield: 11%. Absorption maximum in methanol: 513 Nm.

PREPARATION 2

3-methyl-4[(2-thio - 3 - ethyl - 4 - hydroxy-5-thiazolyl)-methylene]-5-isoxazolone

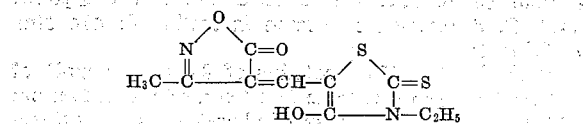

To a solution of 2.86 g. (0.022 mol) of ethyl acetoacetate in 25 ccs. of ethanol are added 1.53 g. (0.022 mol) of hydroxylamine hydrochloride and 2.22 g. (0.022 mol) of triethylamine. The mixture is stirred for half an hour at room temperature and a solution of β-oximinobutyric acid ethyl ester is obtained.

To this solution are added 6.12 g. (0.02 mol) of 3-ethyl-5-acetanilidomethylene rhodanine and 4.04 g. (0.04 mol) of triethylamine. The reaction mixture is refluxed for 1½ hr. on a water bath. After cooling, the dye is precipitated by adding to the mixture 12 ccs. of 2 N hydrochloric acid, filtered by suction, successively washed with water, isopropanol and ether, and recrystallized from 40 ccs. of ethylene glycol monomethyl ether. Yield: 2.7 g. (50%). Melting point: 230°–234° C. Absorption maximum: 460 Nm. $\epsilon = 4.5 \times 10^4$.

PREPARATION 3

3 - methyl - 4 - [1(1 - phenyl - 3 - methyl - 5 - hydroxy-4-pyrazolyl)-ethylidene]-5-isoxazolone

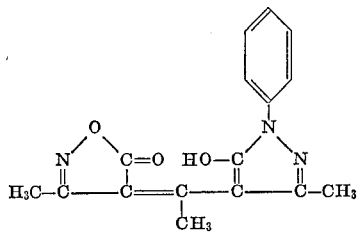

To a solution of 4.29 g. (0.033 mol) of ethyl acetoacetate in 25 ccs. of pyridine are added 2.3 g. (0.033 mol) of hydroxylamine hydrochloride and 3.33 g. (0.033 mol) of triethylamine. The mixture is stirred for ½ hr. at room temperature and a solution of β-oximinobutyric acid ethyl ester is obtained.

To this solution are added 7.32 g. (0.03 mol) of 1 - phenyl - 3 - methyl - 4 - (α - ethoxyethylidene) - 5-pyrazolone and 3.03 g. (0.03 mol) of triethylamine. The reaction mixture is heated for 1½ hour on a water bath. On cooling, a colourless product crystallizes out, which is filtered off. The dye is precipitated by adding an excess of dilute hydrochloric acid. Then it is filtered off, washed with water and recrystallized from ethanol. Yield: 0.6 g. (7%). Melting point: 232° C.; 234° C. Absorption maximum: 440 Nm. $\epsilon = 2.1 \times 10^4$.

PREPARATION 4

3-methyl-4-[(3-methyl-5-hydroxy-4-isoxazolyl)-methylene]-5-isoxazolone

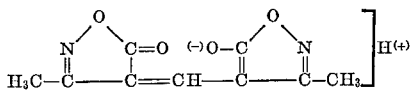

can be prepared according to the following two methods 4(a) and 4(b).

*Method 4(a).*—23.4 g. (0.157 mol) of the sodium salt of 3methyl-4-formyl-5-isoxazolone, prepared according to P. Papini, Gazz. Ital. 80 (1950) 846, are dissolved in 130 ccs. of water. Whilst cooling the solution in an ice bath, 15.7 ccs. of strong hydrochloric acid are added. The precipitated 3 - methyl - 4 - formyl - 5 - isoxazolone is sucked off and washed with water. The precipitate is thereafter dissolved in 30 ccs. of strong hydrochloric acid and the said solution is kept at room temperature for three days during which period 3-methyl-4-[(3-methyl-5-hydroxy-4-isoxazolyl)-methylene]-5-isoxazolone precipitates. The dye is sucked off, washed with water and recrystallized from acetic acid. Yield: 21%. Melting point: 148° C. Absorption maximum in methanol: 414 Nm. $\epsilon = 2.95 \times 10^4$.

*Method 4(b).*—To a solution of 8.4 g. (0.1 mol) of sodium hydrogen carbonate in 50 ccs. of water, first are added 13.5 ccs. (0.1 mol) of ethyl acetoacetate and thereafter portionwise whilst stirring 7 g. (0.1 mol) of hydroxylamine hydrochloride. The reaction mixture is left half an hour and the oxime formed extracted three times with ether. After drying the ether extracts on anhydrous calcium chloride, 15 ccs. (0.1 mol) of ethyl orthoformate and 8 ccs. (0.1 mol) of pyridine are added and the mixture is heated for 2 hrs. on a water bath, in order to slowly evaporate the ether. The dye crystallizes as pyridinium salt, which is separated and washed with ether. Yield: 70%. Melting point: 128–130° C. Absorption maximum in methanol: 415 Nm. $\epsilon = 3.10 \times 10^4$.

The free oxonol dye is obtained in acid form by dissolving the pyridinium salt in water and precipitating with hydrochloric acid. Yield: 73%. Melting point: 148° C. Absorption maximum in methanol: 414 Nm. $\epsilon = 3.10 \times 10^4$.

PREPARATION 5

3-methyl-4[3-(2-methyl-5-hydroxy-4-isoxazolyl)-2-propenylidene]-5-isozazolone

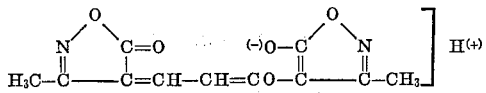

can be prepared according to the following two methods:

*Method 5(a).*—The oxime is prepared as described for the method 4(b). To the ether extracts are added 8 ccs. (0.1 mol) of pyridine and 8.2 g. (0.05 mol) of malondialdehyde tetramethylacetal. The ether is evaporated and the residue is heated for 2 hours on a water bath. The oxonol dye crystallizes partly as pyridine salt. Then the reaction mixture is acidified with hydrochloric acid and the oxonol dye is sucked off in its acid form and washed with water. Yield: 3.6 g. (30%). Melting point: 260° C.

*Method 5(b).*—To a solution of 13.5 ccs. (0.1 mol) of ethyl acetoacetate in 20 ccs. of methanol and 8 ccs. (0.1 mol) of pyridine, 7 g. (0.1 mol) of hydroxylamine hydrochloride are added, which gradually dissolves whilst slightly heating. To this solution another 8 ccs. of pyridine and 8.2 g. (0.05 mol) of malondialdehyde tetramethylacetal are added and the mixture is heated for 2 hours on a water bath. Then the mixture is poured in 100 ml. of 1 N hydrochloric acid. The precipitated dye is sucked off and washed with water. Yield: 39 g. (33%). Melting point: 260° C. Absorption maximum in methanol: 503 Nm. $\epsilon = 8.15 \times 10^4$.

The dyestuffs according to the general formula cited above can be incorporated in a photographic material according to known techniques. They can be incorporated into light-sensitive silver halide layer as well as into non-light-sensitive colloid layers, which can be situated above, below or between the light-sensitive layers. Said dyestuffs when used as screening dye in a light-sensitive silver halide emulsion layer do not or practically do not decrease the inherent and/or spectral sensitivity of the silver halide.

It is possible to use one or more filter layers of the present invention in a multilayer colour material having three light-sensitive layers, and to use a support coated with an anti-halation layer in contact with the last silver halide emulsion layer. Thus the structure of a photographic multilayer colour material can be as follows: an ordinary blue-sensitive silver halide emulsion layer, a yellow filter layer, a green-sensitized silver halide emulsion layer, a red-filter layer a red-sensitized silver halide emulsion layer, an anti-halation layer absorbing at least red light, a subbing layer and a support.

In cases wherein the dyes have to be present in a form more resistant to diffusion, the methine dyes of the general formula are used in the silver salt form. These salts can be formed by reaction of silver nitrate with the methine dyes in acid form or soluble salt form.

The following examples illustrate further the present invention.

*Example 1.*—A pink layer with a density of 1.05 at $\lambda_{max.}$ 521 Nm. is obtained by coating onto a cellulose triacetate support a mixture of the dyestuff prepared according to preparation 1-method 1(b) and gelatin pro rata of 50 mg. of dyestuff per sq.m.

*Example 2.*—A yellow layer with a density of 0.75 at $\lambda_{max.}$ 466 Nm. is obtained by coating a mixture of the dyestuff prepared according to preparation 2 and gelatin pro rata of 190 mg. of dyestuff per sq.m.

*Example 3.*—A yellow layer with a density of 0.5 at $\lambda_{max}$. 443 Nm. is obtained by coating onto a cellulose triacetate support a mixture of the dyestuff prepared according to preparation 3 and gelatin pro rata of 200 mg. of dyestuff sq.m.

*Example 4.*—A yellow layer with a density of 1.15 at $\lambda_{max}$. 415 Nm. is formed by coating a mixture of gelatin and the dyestuff prepared according to method 4(b) of preparation 1 pro rata of 135 mg. dyestuff per sq.m.

*Example 5.*—A pink layer with a density of 1.0 at $\lambda_{max}$. 508 Nm. is formed by coating a mixture of gelatin and the dyestuff prepared according to method 5(b) of preparation 2 pro rata of 50 mg. dyestuff per sq.m.

What I claim is:

1. An element comprising a colloid layer containing a methine dye of the following general formula:

$$\begin{bmatrix} & O & & & P \\ N & \diagdown & C-O^{(-)} & & \diagup \\ R-C & — & C-L_1=(L_2-L_3)_{n-1}=C & \\ \| & & & \diagdown Q \end{bmatrix} M^{(+)}$$

wherein:
R represents a lower alkyl radical,
$L_1$ represents $$-CH= \text{ or } =C- \\ \phantom{-CH= \text{ or } =}\overset{|}{CH_3}$$

$L_2$ represents =CH—,
$L_3$ represents $$-C= \\ \overset{|}{R_3}$$

where $R_3$ is hydrogen or lower alkyl,
$n$ represents 1 or 2,
$M^{(+)}$ represents a hydrogen, metal, or onium cation, and each of P and Q represents an electronegative group, or $$\begin{matrix} P \diagdown \\ \phantom{P} C= \\ Q \diagup \end{matrix}$$

represents the atoms necessary to close a heterocyclic nucleus with electronegative character.

2. A light-sensitive photographic material comprising a colloid layer according to claim 1.

3. A light-sensitive photographic material comprising a colloid layer according to claim 1, which is a light-sensitive silver halide emulsion layer.

4. An element comprising a colloid layer containing dye of the following general formula:

$$\begin{bmatrix} & O & & & & O & \\ N & \diagdown & C=O & & (-)O-C & \diagdown & N \\ \| & & | & & | & & \| \\ R_1-C & — & C=(L_1-L_2)_{n-1}=L_3-C & — & C-R_1 \end{bmatrix} M^{(+)}$$

wherein:
$R_1$ represent a lower alkyl radical,
$L_1$ represents $$-CH= \text{ or } =C- \\ \phantom{-CH= \text{ or } =}\overset{|}{CH_3}$$

$L_2$ represents =CH—,
$L_3$ represents $$-C= \\ \overset{|}{R_3}$$

where $R_3$ is hydrogen or lower alkyl,
$n$ represents 1 or 2, and
$M^{(+)}$ represents a hydrogen, metal, or onium cation.

5. A light-sensitive photographic material comprising a colloid layer according to claim 4.

6. A light-sensitive photographic material comprising a colloid layer according to claim 4, which is a light-sensitive silver halide emulsion layer.

References Cited

UNITED STATES PATENTS 2,743,273   4/1956   Knott _____ 96—102

NORMAN G. TORCHIN, Primary Examiner

RONALD H. SMITH, Assistant Examiner

U.S. Cl. X.R.

117—333; 252—300; 260—2401